United States Patent
Yu et al.

(10) Patent No.: US 10,103,578 B2
(45) Date of Patent: Oct. 16, 2018

(54) POWER SUPPLY DEVICE, INTEGRATED CIRCUIT, ENERGY TRANSMITTER AND IMPEDANCE MATCHING METHOD

(71) Applicant: Silergy Semiconductor Technology (Hangzhou) LTD, Hangzhou, ZheJiang Province (CN)

(72) Inventors: Feng Yu, Hangzhou (CN); Chen Zhao, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 452 days.

(21) Appl. No.: 14/737,817

(22) Filed: Jun. 12, 2015

(65) Prior Publication Data
US 2015/0380944 A1  Dec. 31, 2015

(30) Foreign Application Priority Data
Jun. 27, 2014  (CN) .......................... 2014 1 0304778

(51) Int. Cl.
  *H02J 50/12*    (2016.01)
  *H02J 17/00*    (2006.01)
(52) U.S. Cl.
  CPC .............. *H02J 50/12* (2016.02); *H02J 17/00* (2013.01)
(58) Field of Classification Search
  None
  See application file for complete search history.

(56) References Cited

U.S. PATENT DOCUMENTS

| | | | |
|---|---|---|---|
| 3,968,493 A * | 7/1976 | Last | G01R 25/08 324/76.53 |
| 7,119,311 B2 | 10/2006 | Makoto | |
| 8,581,444 B2 | 11/2013 | Urano | |
| 2011/0080056 A1* | 4/2011 | Low | H02J 5/005 307/104 |
| 2011/0221569 A1* | 9/2011 | Hamel | A61B 5/0031 340/9.1 |
| 2014/0175868 A1 | 6/2014 | Sakakibara et al. | |
| 2015/0061578 A1* | 3/2015 | Keeling | H02J 50/80 320/108 |
| 2015/0061579 A1 | 3/2015 | Katsunaga et al. | |
| 2015/0326031 A1* | 11/2015 | Yamaguchi | H02J 17/00 307/104 |
| 2017/0203656 A1* | 7/2017 | Okamoto | H02J 50/80 |

FOREIGN PATENT DOCUMENTS

WO    2013128641 A1    9/2013

* cited by examiner

*Primary Examiner* — Jared Fureman
*Assistant Examiner* — Joel Barnett
(74) *Attorney, Agent, or Firm* — Michael C. Stephens, Jr.

(57) ABSTRACT

A resonance contactless power supply device can include: (i) a converter configured to convert an input power signal to an adjustable DC voltage; (ii) an inverter configured to receive the adjustable DC voltage, and to generate an AC voltage with a leakage inductance resonance frequency; (iii) a first resonance circuit having a transmitting coil, and being configured to receive the AC voltage from the inverter; (iv) a second resonance circuit comprising a receiving coil that is contactlessly coupled to the transmitting coil, where the second resonance circuit is configured to receive electric energy from the transmitting coil; and (v) a control circuit configured to control the adjustable DC voltage according to a phase difference between the AC voltage and an AC current output by the inverter, such that the phase difference is maintained as a predetermined angle.

20 Claims, 10 Drawing Sheets

POWER SUPPLY DEVICE, INTEGRATED CIRCUIT, ENERGY TRANSMITTER AND IMPEDANCE MATCHING METHOD

RELATED APPLICATIONS

This application claims the benefit of Chinese Patent Application No. 201410304778.1, filed on Jun. 27, 2014, which is incorporated herein by reference in its entirety.

FIELD OF THE INVENTION

The present disclosure relates the field of power electronics, and in particular to power supply devices, integrated circuits, energy transmitters, and impedance matching approaches.

BACKGROUND

Contactless power supply technology is widely applicable to a variety of electronic products, such as relatively low power electronic products (e.g., mobile phones, MP3 players, digital cameras, laptops, etc.). Typically, contactless power supply equipment includes a transformer with a transmitting coil (L1) and a receiving coil (L2). Energy can be transmitted from an electric energy transmitter to an electric energy receiver in accordance with magnetic coupling characteristics of the transmitting and receiving coils of the transformer.

SUMMARY

In one embodiment, a resonance contactless power supply device can include: (i) a converter configured to convert an input power signal to an adjustable DC voltage; (ii) an inverter configured to receive the adjustable DC voltage, and to generate an AC voltage with a leakage inductance resonance frequency; (iii) a first resonance circuit having a transmitting coil, and being configured to receive the AC voltage from the inverter; (iv) a second resonance circuit comprising a receiving coil that is contactlessly coupled to the transmitting coil, where the second resonance circuit is configured to receive electric energy from the transmitting coil; and (v) a control circuit configured to control the adjustable DC voltage according to a phase difference between the AC voltage and an AC current output by the inverter, such that the phase difference is maintained as a predetermined angle.

In one embodiment, an integrated circuit configured for a resonance contactless energy transmitter, can include: (i) a converter configured to convert an input power signal to an adjustable DC voltage; (ii) an inverter configured to receive the adjustable DC voltage, and to generate an AC voltage with a leakage inductance resonance frequency, wherein the AC voltage is configured to drive a first resonance circuit of the resonance contactless energy transmitter; and (iii) a control circuit configured to control the adjustable DC voltage according to a phase difference between an AC voltage and an AC current from the inverter, such that the phase difference is maintained as a predetermined angle.

In one embodiment, an impedance matching method for a resonance contactless power supply device, can include: (i) converting an input power signal to an adjustable DC voltage for an inverter; and (ii) controlling the adjustable DC voltage according to a phase difference between an AC voltage and an AC current output by the inverter, for maintaining the phase difference as a predetermined angle.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In order to improve energy transmission efficiency, passive impedance matching loop can be employed in the resonance and magnetic coupling circuit of a contactless power supply device. For example, "contactless" or "contactlessly" as used herein can mean no direct physical or mechanical connection therebetween, such as in a wireless type of connection.

Figure 1:
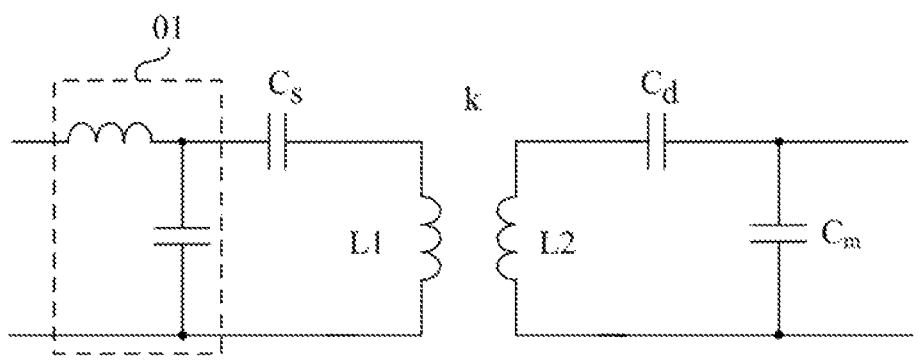
FIG. 1 is a schematic block diagram of an example resonance and magnetic coupling circuit with a magnetic coupling loop.

Referring now to FIG. 1, shown is a schematic block diagram of an example resonance and magnetic coupling circuit with a magnetic coupling loop. In this particular example, LC impedance matching loop 01 can be utilized in a resonance circuit at a transmitting side, in order to effectively reduce a current flowing through a power switch and a primary transmitting coil in a high frequency inverting circuit. In addition, matching capacitor $C_m$ can connect in parallel to an output port of a resonance circuit at a receiving side, in order to regulate the impedance from a load to the transmitting terminal and to maintain a resonance frequency of the receiving terminal within a certain range.

In this way, the resonance and magnetic coupling circuit can output a relatively large voltage in a wide frequency range to achieve higher energy transmission efficiency, as compared to other approaches. However, the load impedance can be different from an ideal resonance designed for the matching loop, and the device may be relatively large and heavy because of the passive impedance matching loop, in addition to possibly worsened controllability considerations.

In one embodiment, a resonance contactless power supply device can include: (i) a converter configured to convert an input power signal to an adjustable DC voltage; (ii) an inverter configured to receive the adjustable DC voltage, and to generate an AC voltage with a leakage inductance resonance frequency; (iii) a first resonance circuit having a transmitting coil, and being configured to receive the AC voltage from the inverter; (iv) a second resonance circuit comprising a receiving coil that is contactlessly coupled to the transmitting coil, where the second resonance circuit is configured to receive electric energy from the transmitting coil; and (v) a control circuit configured to control the adjustable DC voltage according to a phase difference between the AC voltage and an AC current output by the inverter, such that the phase difference is maintained as a predetermined angle.

In one embodiment, an integrated circuit configured for a resonance contactless energy transmitter, can include: (i) a converter configured to convert an input power signal to an adjustable DC voltage; (ii) an inverter configured to receive the adjustable DC voltage, and to generate an AC voltage with a leakage inductance resonance frequency, wherein the AC voltage is configured to drive a first resonance circuit of the resonance contactless energy transmitter; and (iii) a control circuit configured to control the adjustable DC voltage according to a phase difference between an AC voltage and an AC current from the inverter, such that the phase difference is maintained as a predetermined angle.

Figure 2:
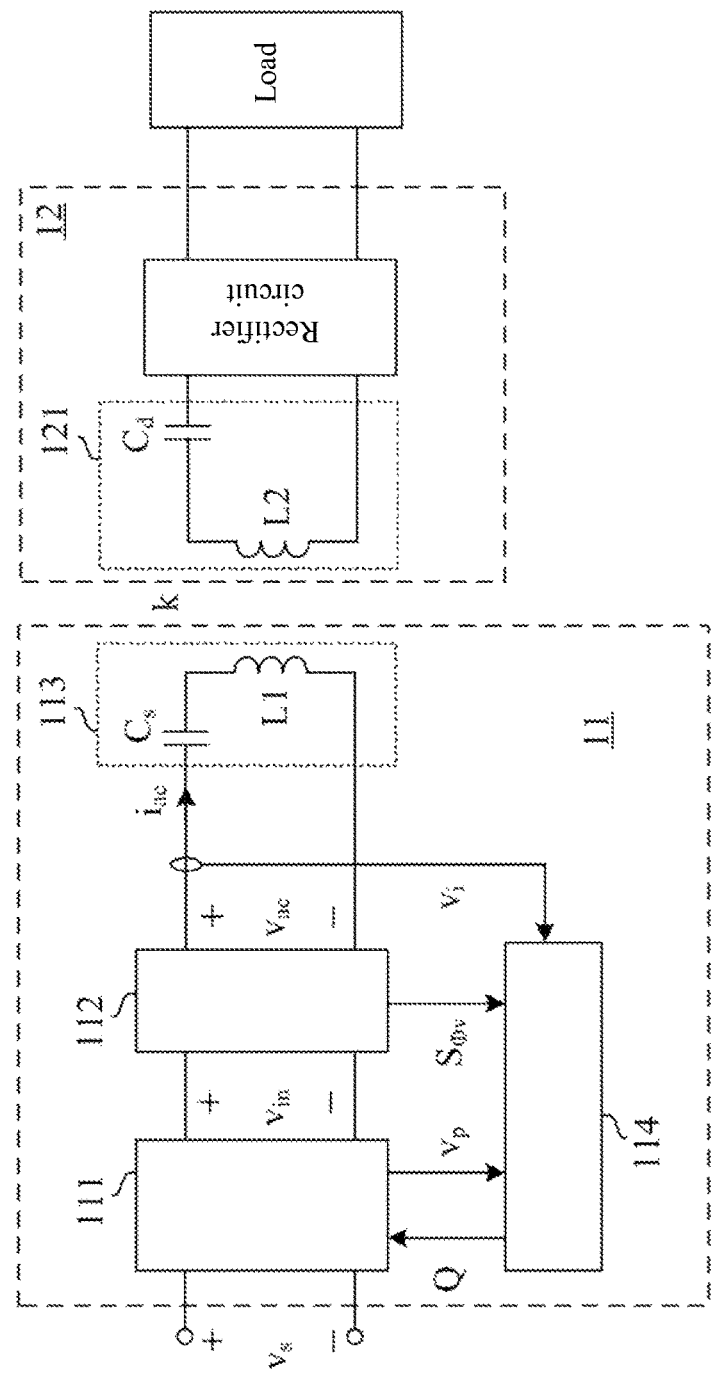
FIG. 2 is a schematic block diagram of an example resonance contactless power supply device, in accordance with embodiments of the present invention.

Referring now to FIG. 2, shown is a schematic block diagram of an example resonance contactless power supply device, in accordance with embodiments of the present invention. In this particular example, resonance contactless power supply device 10 can include energy transmitter 11 and energy receiver 12. For example, energy transmitter 11 can include converter 111, inverter 112, resonance circuit 113, and control circuit 114. Converter 111 can convert input power signal $V_s$ to adjustable DC voltage $V_{in}$. If input power signal $V_s$ is an AC power signal, converter 111 can accordingly be an AC-DC converter. However, if the input power signal is a DC power signal, converter 111 can accordingly be a DC-DC converter. In either case, the converter can be a switching type of converter (e.g., boost, buck, etc.).

Inverter 112 can receive adjustable DC voltage $V_{in}$, and may generate AC voltage $V_{ac}$ with a leakage inductance resonance frequency. In this particular example, the leakage inductance resonance frequency can be a resonance frequency. Self-inductances of a transmitting coil and a receiving coil can be separately decoupled into two parts (e.g., a leakage inductance and a mutual inductance). Further, the leakage inductance and the impedance of a resonance capacitor of resonance circuit 113, and the leakage inductance and the impedance of a resonance capacitor of the resonance circuit 121, may offset each other. Accordingly, when the circuit operates at the leakage inductance resonance frequency, the system efficiency can be improved.

Resonance circuit 113 can include transmitting coil L1, and may be configured to receive AC voltage $V_{ac}$ from inverter 112, and to transmit energy to energy receiver 12. In order to balance the leakage inductance of resonance circuit 113 and the inductance of resonance circuit 121, as well as other parasitic parameters, to eliminate a voltage peak and surge current caused by these parasitic parameters, to reduce electromagnetic interference and power noises, to reduce apparent power, and to improve power factor, capacitor $C_s$ can be employed in resonance circuit 113. Capacitor $C_s$ can be coupled in series or in parallel with transmitting coil L1 to form a resonance circuit. Those skilled in the art will recognize that distributed capacitors, such as distributed capacitors between transmitting coils, can be used as the resonance capacitor $C_s$ instead of employing an independent capacitor.

Control circuit 114 can generate control signal Q according to phase difference $\Delta\varphi$ between AC voltage $V_{ac}$ and AC current $i_{ac}$ output by inverter 112. Control signal Q can regulate adjustable AC voltage $V_{ac}$ by controlling converter 111, and may maintain phase difference $\Delta\varphi$ be substantially at predetermined angle $\varphi$th.

Energy receiver 12 can be contactlessly coupled to energy transmitter 11 for receiving electric energy. For example, energy receiver 12 can include resonance circuit 121. Resonance circuit 121 can include receiving coil L2 that is contactlessly coupled to transmitting coil L1. Resonance circuit 121 can be utilized to receive electric energy from the transmitting coil. Further, in order to reduce the reactive power consumption at energy receiver 12, and to increase the active power transmitted by the resonance and magnetic coupling circuit, resonance capacitor $C_d$ can be employed in resonance circuit 121. As described above, resonance capacitor $C_d$ can utilize distributed capacitors, such as distributed capacitors between transmitting coils, of other components in the circuit, as opposed to employing any specialized/independent capacitors in the circuit. Energy receiver 12 can also include a rectifier circuit, in order to rectify signals received by resonance circuit 121, and a load may be coupled to an output port of the rectifier circuit.

Figure 3A:
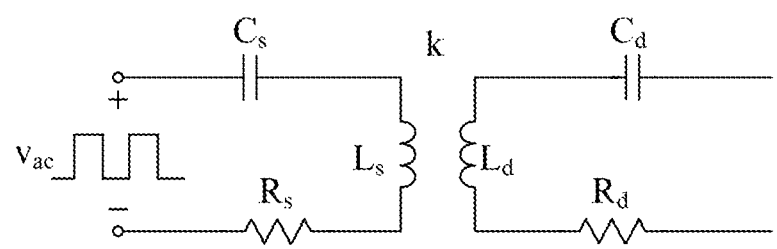
FIGS. 3A-3C are schematic block diagrams of example equivalent circuit diagrams of a resonance and magnetic coupling circuit, in accordance with embodiments of the present invention.
Figure 3B:
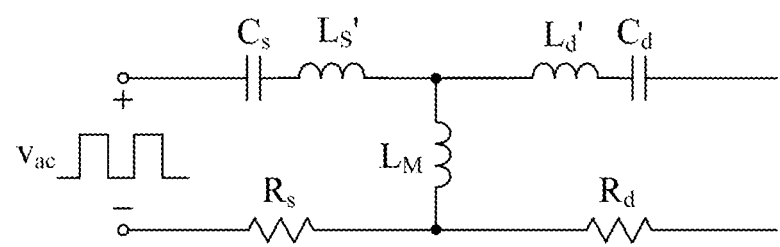
Figure 3C:
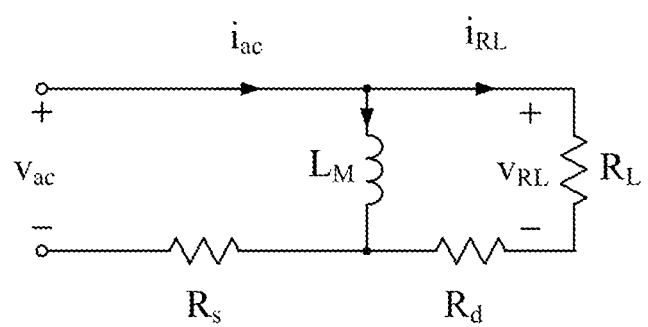

Referring now to FIGS. 3A-3C, shown are schematic block diagrams of example equivalent circuit diagrams of a resonance and magnetic coupling circuit, in accordance with embodiments of the present invention. As shown in FIG. 3A in a circuit diagram of resonance circuits 113 and 121, transmitting coil L1 is equivalent to ideal coil $L_s$ and coil resistor $R_s$, and receiving coil L2 is equivalent to ideal coil $L_d$ and coil resistor $R_d$. Ideal coils $L_s$ and $L_d$ are coupled to each other, and resonance circuits 113 and 121 may form a series resonance circuit. For example, resonance circuit 113 can include resonance capacitor $C_s$, and resonance circuit 121 can include resonance capacitor $C_d$.

As described above, resonance capacitors $C_s$ and $C_d$ can be integrated components, or distributed capacitors of other components. In this way, the resonance and magnetic coupling circuit can include a mutual inductance coupled circuit. Generally, resonance circuits 113 and 121 may have the same resonance frequency in order to transmit energy by way of resonance, as below:

$$f_s = 1/2\pi \cdot \sqrt{L_s \cdot C_s} = 1/2\pi \cdot \sqrt{L_d \cdot C_d} = f_d$$

For example, $f_s$ may represent the resonance frequency of resonance circuit 113, $f_d$ may represent the resonance frequency of resonance circuit 121, $L_s$ and $L_d$ may represent the inductances of the ideal coils, $C_s$ and $C_d$ may represent the capacitances of the resonance capacitors. For example, by setting the inductance of ideal coil $L_s$ as equal to the inductance of ideal coil $L_d$, and the capacitance of resonance capacitor $C_s$ as equal to the capacitance of resonance capacitor $C_d$, the resonance frequency of resonance circuit 113 can be made the same as that of resonance circuit 121.

The above described resonance frequency may be referred as a self-inductance resonance frequency, as compared to the leakage inductance resonance frequency mentioned above. In this case, resonance circuit 113 may resonant simultaneously with resonance circuit 121 with the self-inductance resonance frequency, and all inductances and capacitances in the resonance and magnetic coupling circuit may offset each other, such that high efficiency can be achieved. Leakage inductance and mutual inductance can exist when transmitting coil L1 is coupled with receiving coil L2. The resonance and magnetic coupling circuit of FIG. 3A can be modeled in the form of FIG. 3B, whereby mutually coupled ideal coils $L_s$ and $L_d$ are decoupled to leakage inductor $L_s'$, leakage inductor $L_d'$, and mutual inductor $L_M$.

For the circuit in FIG. 3A, coupling factor k may be affected by the configuration and surroundings, to result in variations of leakage inductor $L_s'$, leakage inductor $L_d'$, and mutual inductor $L_M$ in FIG. 3B. In a case where the remaining circuit elements except for the load are determined in energy transmitter 11 and energy receiver 12, and the coupling relationship between load impedance $R_L$ and mutual inductor $L_M$ meets a certain requirement, such as $R_L < \omega_0 L_M$, input current $i_{in}$ can be at a maximum as the frequency of input voltage $V_{ac}$ reaches the leakage inductance resonance frequency. In a case whereby $L_s'C_s = L_d'C_d$, the leakage inductance resonance frequency can equal:

$$\frac{1}{2\pi \cdot \sqrt{L_s' \cdot C_s}}.$$

For example $L_s'$ may represent the inductance of the associated leakage inductor, and can equal $L_s - L_M$. Based on this property, the leakage inductance resonance frequency can be obtained by scanning the predetermined frequency range.

FIG. 3C is an equivalent circuit diagram of the resonance and magnetic coupling circuit, the rectifier circuit, and the load when AC voltage $V_{ac}$ input to resonance circuit 113 is the leakage inductance resonance frequency. In this example, when the circuit operates in the leakage inductance resonance frequency, leakage inductor $L_s'$ and resonance capacitor $C_s$ in resonance circuit 113 may offset leakage inductor $L_d'$ and resonance capacitor $C_d$ in resonance circuit 121. Thus, the circuit can be modeled as a two-port loop including mutual inductor $L_M$ and coil resistors $R_s$ and $R_d$. Coil resistors $R_s$ and $R_d$ may be ignored when they are very small, such that mutual inductor $L_M$ can be visualized as being coupled to the output port in parallel. Therefore, the resonance and magnetic coupling circuit can output a constant voltage according to the input voltage, as shown in the relation: $v_{R_L} \approx v_{ac}$.

The resonance and magnetic coupling circuit may present different resonant characteristic when the impedance at the output port is different. However, as long as the coupling relationship (e.g., including coupling factor k or mutual inductor $L_M$) between transmitting coil L1 and receiving coil L2 remains unchanged, in a case whereby the circuit operates at the leakage inductance resonance frequency, leakage inductor $L_s'$ and resonance capacitor $C_s$ in resonance circuit 113 may still offset leakage inductor $L_d'$ and resonance capacitor $C_d$ in resonance circuit 121. Therefore, the equivalent circuit when the power supply device operates at the leakage inductance resonance frequency (after scanning the leakage inductance resonance frequency) may be as modeled as FIG. 3C. Thus, the power supply device can be directly coupled to the load as the output is substantially constant, and the system efficiency can be improved as various effects of detuning are reduced.

As shown in the equivalent circuit shown in FIG. 3C, when load equivalent impedance $R_L$ is relatively large, almost all of the input current may flow through mutual inductor $L_M$. Thus, only a relatively small amount energy may be transmitted to the load, and the system energy transmission efficiency can accordingly be very low. If load equivalent impedance $R_L$ is relatively small, the current in the load loop may be relatively large. Thus, transmitting coil resistor $R_s$ and receiving coil resistor $R_d$ may consume much energy, resulting in relatively low system efficiency. Therefore, the load equivalent impedance should be optimized under different cases with impedance matching.

The load can be electrical equipment with constant power, where the load power $P_L$ is a constant value. When the resonance and magnetic coupling circuit of the resonance contactless power supply device of this particular example operates at the leakage inductance resonance frequency, input AC voltage $V_{ac}$ approximately equals voltage $V_{RL}$ on the load and the equivalent load of the rectifier circuit: $V_{ac} \approx V_{RL}$. Load equivalent impedance $R_L$ can be calculated according to the output voltage and the load power, as shown below:

$$R_L = \frac{V_{RL}^2}{P_L}$$

Accordingly, when the load includes electrical equipment with constant power in this particular example, load equivalent impedance $R_L$ may be a function of AC voltage $V_{ac}$, as shown below:

$$R_L = \frac{V_{ac}^2}{P_L}$$

As the amplitude of $V_{ac}$ is associated with adjustable DC voltage $V_{in}$, the load equivalent impedance can be regulated by regulating adjustable DC voltage $V_{in}$ to achieve impedance matching. For the equivalent circuit shown in FIG. 3C, system efficiency $\eta$ can be as shown below:

$$\eta = \frac{R_L}{R_s \left[ \left( \frac{R_L + R_d}{\omega_1 L_M} \right)^2 + 1 \right] + R_L + R_d}$$

For example $R_L$ can represent the load equivalent impedance, Rs may represent the transmitting coil resistor, $R_d$ may represent the receiving coil resistor, $L_M$ may represent the mutual inductor, and $\omega_1$ may represent the leakage inductance resonance frequency. Suppose $R_s = R_d$, and $R_s$ is far less than $R_L$, when $R_L = \sqrt{2} \cdot \omega_1 \cdot L_M$, system efficiency $\eta$ can be at a maximum.

In FIG. 3C, when $R_L$, satisfies the condition for obtaining the maximum system efficiency $\eta$, the phase difference between AC voltage $V_{ac}$ and AC current $I_{ac}$ may be about 55° (e.g., phase difference $\Delta \varphi$ between phase $\varphi_v$ of the AC voltage and phase $\varphi_i$ of the AC current is about 55°). That is, when phase $\varphi_i$ of AC current $i_{ac}$ lags phase $\varphi_v$ of AC voltage $V_{ac}$ by 55°, the system efficiency may be at a maximum. However, high efficiency may be achieved when the phase difference is in a range of from about 50° to about 60°, such as about 55°, depending on different circuit parameters. Therefore, by regulating adjustable DC voltage $V_{in}$ for inverter 112, the phase difference between AC voltage $V_{ac}$ and AC current $I_{ac}$ can remain as a predetermined value in order to realize impedance matching of the resonance contactless power supply device.

Figure 4:
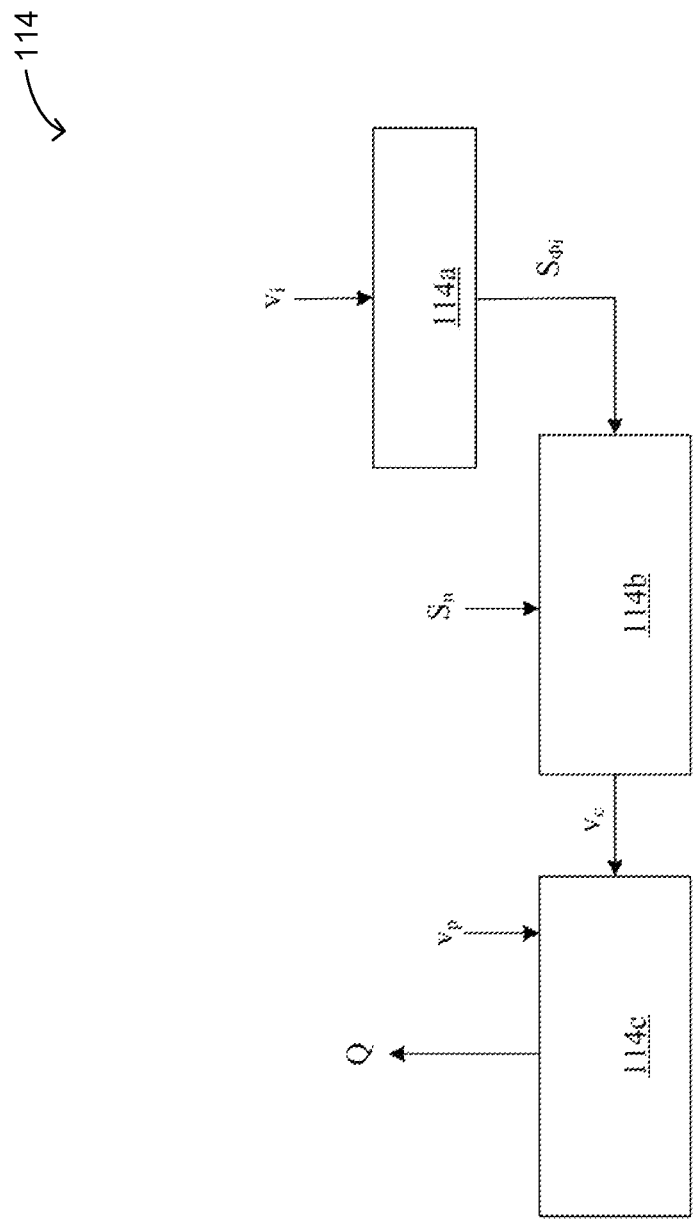
FIG. 4 is a schematic block diagram of an example control circuit, in accordance with embodiments of the present invention.

Referring now to FIG. 4, shown is a schematic block diagram of an example control circuit, in accordance with embodiments of the present invention. In this particular example, controller 114 can include current phase detector 114a, compensation signal generator 114b, and control signal generator 114c. Current phase detector 114a can detect phase $\varphi_i$ of AC current $i_{ac}$, and may output current phase signal $S_{\varphi i}$.

For example, current phase detector 114a can receive sense signal $V_i$ obtained by sampling (e.g., via a current sampling circuit) AC current $i_{ac}$ of inverter 112 (see, e.g., FIG. 2), and detect a zero-crossing point of sense signal $V_i$ in order to determine whether AC current $i_{ac}$ is positive or negative. For example, current phase signal $S_{\varphi i}$ may be high (e.g., a high logic level) when AC current $i_{ac}$ flows in a first direction, and may be low when AC current $i_{ac}$ flows in a direction that is opposite to the first direction. Alternatively, current phase signal $S_{\varphi i}$ can be low when AC current $i_{ac}$ flows in the first direction, and high when AC current $i_{ac}$ flows in the opposite direction.

Compensation signal generator 114b can obtain phase difference $\Delta\varphi$ according to control signal $S_n$ of inverter 112 and current phase signal $S_{\varphi i}$, and may generate compensation signal $V_c$ according to phase difference $\Delta\varphi$ and predetermined angle $\varphi$th. For example, compensation signal generator 114b can obtain phase difference signal $S_{\Delta\varphi}$, and may generate compensation signal $V_c$ according to phase difference signal $S_{\Delta\varphi}$ and angle threshold signal $S_{\varphi th}$. For example, phase difference signal $S_{\Delta\varphi}$ is proportional to phase difference $\Delta\varphi$, and angle threshold signal $S_{\varphi th}$ is proportional to predetermined angle $\varphi$th. Compensation signal $V_c$ may provide error information between phase difference $\Delta\varphi$ and predetermined angle $\varphi$th, for subsequent control signal generator 114c.

Figure 5:
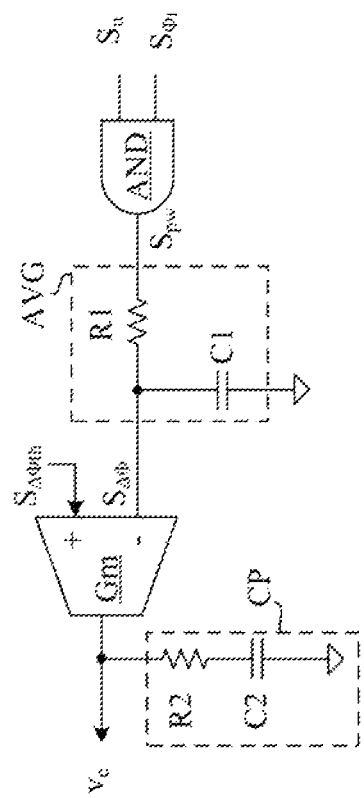
FIG. 5 is a schematic block diagram of an example compensation signal generator, in accordance with embodiments of the present invention.

Referring now to FIG. 5, shown is a schematic block diagram of an example compensation signal generator, in accordance with embodiments of the present invention. In this particular example, compensation signal generator 114b can include AND-gate "AND," averaging circuit "AVG," error amplifying circuit Gm, and compensation circuit CP. The AND-gate can receive current phase signal $S_{\varphi i}$ and control signal $S_n$, and may generate phase difference width signal $S_{pw}$. For example, phase difference width signal $S_{pw}$ may have a pulse width that corresponds to phase difference $\Delta\varphi$.

Control signal $S_n$ can be used to control the frequency and phase of the inverter, and control signal $S_n$ has the same or opposite phase but the same frequency as AC voltage $V_{ac}$ output by inverter 112. As described above, current phase signal $S_{\varphi i}$ may be high when AC current $i_{ac}$ flows in a first direction, and low when AC current $i_{ac}$ flows in a direction opposite to the first direction. Alternatively, current phase signal $S_{\varphi i}$ may be low when AC current $i_{ac}$ flows in the first direction, and high when AC current $i_{ac}$ flows in the opposite direction. Also, control signal $S_n$ with an opposite phase to AC voltage $V_{ac}$ can be used to generate phase difference width signal $S_{pw}$.

Figure 6:
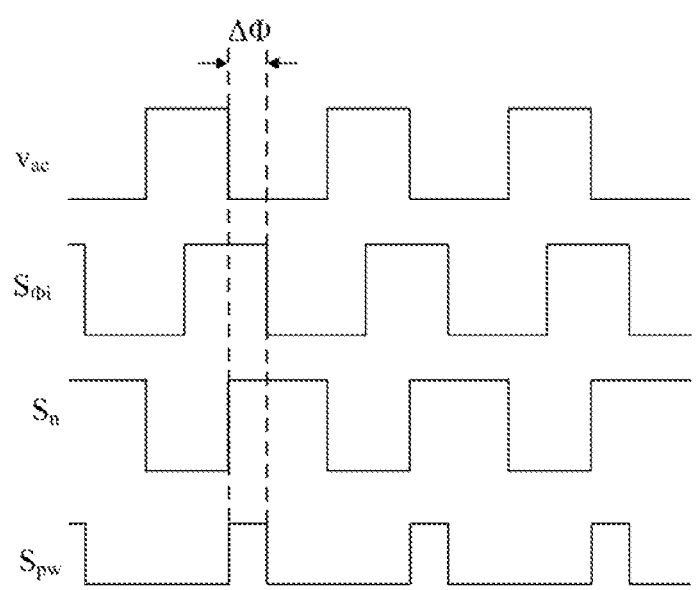
FIG. 6 is a waveform diagram of example operation of a compensation signal generator, in accordance with embodiments of the present invention.

Referring now to FIG. 6, shown is a waveform diagram of example operation of a compensation signal generator, in accordance with embodiments of the present invention. In this particular example, AC current $i_{ac}$ AC voltage $V_{ac}$ with phase difference $\Delta\varphi$, and current phase signal $S_{\varphi i}$ has the same phase as AC current $V_{ac}$, while control signal $S_n$ has an opposite phase as AC voltage $V_{ac}$. The AND-gate may output a high level when both current phase signal $S_{\varphi i}$ and control signal $S_n$ are high, and a low level otherwise. Therefore, the high level pulse width of the signal output by the AND-gate can correspond to phase difference $\Delta\varphi$.

Those skilled in the art will recognize that the low level pulse width can correspond to phase difference $\Delta\varphi$ by setting different signals. Averaging circuit AVG can be used to average phase difference width signal $S_{pw}$, and to generate phase difference signal $S_{\Delta\varphi}$. Because phase difference signal $S_{\Delta\varphi}$ may have a pulse width that corresponds to that of phase difference $\Delta\varphi$, the average of the averaged signal can be in direct proportion to the high level pulse width. Thus, phase difference signal $S_{\Delta\varphi}$ generated by averaging circuit AVG can be proportional to phase difference $\Delta\varphi$.

In the circuit example of FIG. 5, averaging circuit AVG is an RC filter circuit that includes resistor R1 and capacitor C1. Resistor R1 can connect between the output terminal of the AND-gate and the input terminal of error amplifying circuit Gm. Capacitor C1 can connect between the input terminal of error amplifying circuit Gm and ground. Error amplifying circuit Gm can compare signal $S_{\Delta\varphi}$ that is proportional to phase difference $\Delta\varphi$ against angle threshold signal $S_{\varphi th}$, and may generate an error amplifying signal. Compensation circuit CP can compensate the error amplifying signal, and may generate compensation signal $V_c$. The ratio between angle threshold signal $S_{\varphi th}$ and predetermined angle $\varphi$th may equal a ratio between signal $S_{\Delta\varphi}$ and phase difference $\Delta\varphi$. Error amplifying circuit Gm (e.g., a transconductance amplifier) can generate the error between signal $S_{\Delta\varphi}$ and angle threshold signal $S_{\varphi th}$.

Compensation circuit CP can generate compensation signal $V_c$ by compensating the error amplifying signal from error amplifying circuit Gm. Compensation circuit CP can be realized by an RC circuit, which can include resistor R2 and capacitor C2 connected in series at the output terminal of error amplifying circuit Gm. Compensation signal $V_c$ can be provided to control signal generator 114c. Control signal generator 114c can adopt peak current control mode, and may generate control signal Q according to current sense signal $V_p$ and compensation signal $V_c$ of the power stage circuit of converter 111. Control signal Q can regulate adjustable DC voltage $V_{in}$, so as to maintain phase difference $\Delta\varphi$ of AC voltage $V_{ac}$ and AC current $i_{ac}$ obtained by inverting adjustable DC current $V_{in}$ as predetermined angle $\varphi$th.

Figure 7:
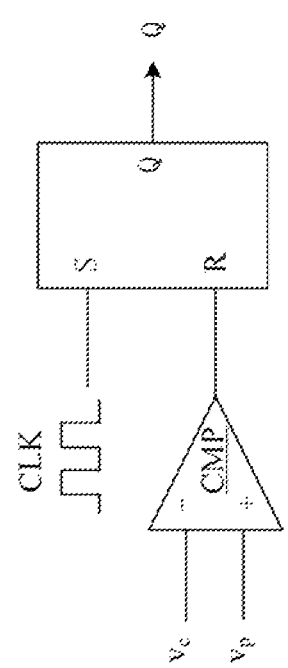
FIG. 7 is a schematic block diagram of an example control signal generator, in accordance with embodiments of the present invention.

Referring now to FIG. 7, shown is a schematic block diagram of an example control signal generator, in accordance with embodiments of the present invention. In this particular example, control signal generator 114c can include comparison circuit CMP and an RS flip-flop. Comparison circuit CMP may receive current sense signal $V_p$ of the power stage circuit at a non-inverting input terminal, and compensation signal $V_c$ at an inverting input terminal, and may have an output terminal coupled to the reset terminal of the RS flip-flop. The set terminal of the RS flip-flop can receive clock signal CLK, and the RS flip-flop can generate control signal Q. For example, control signal Q can be used to control the duty cycle of the power switch of converter 111, in order to maintain the phase difference between AC voltage $V_{ac}$ and AC current $i_{ac}$ as predetermined angle $\varphi$th.

From the circuits shown in FIGS. 5 and 7, control circuit 114 can be configured as a feedback control loop with an aim to regulate the phase difference between the AC voltage and the AC current by a current control mode. Therefore, by maintaining the phase difference as the predetermined angle, the system can remain in an impedance matching state, and the system transmission efficiency can be relatively high. In this particular example, a converter is configured before the inverter in order to regulate the input voltage of the resonance and magnetic coupling circuit of the resonance contactless power supply, to achieve impedance matching regardless of load impedance.

In this way, the controllability and adjustability of the circuit impedance matching can be greatly improved relative to other approaches. The control circuit can be an independent integrated circuit. In other cases, the converter, inverter, and control circuit can be integrated together in an integrated circuit, and a resonance contactless energy transmitter can be built by connecting the integrated circuit to the resonance circuit 113 via suitable peripheral circuits.

In one embodiment, an impedance matching method for a resonance contactless power supply device, can include: (i) converting an input power signal to an adjustable DC voltage for an inverter; and (ii) controlling the adjustable DC voltage according to a phase difference between an AC voltage and an AC current output by the inverter, for maintaining the phase difference as a predetermined angle.

Figure 8:
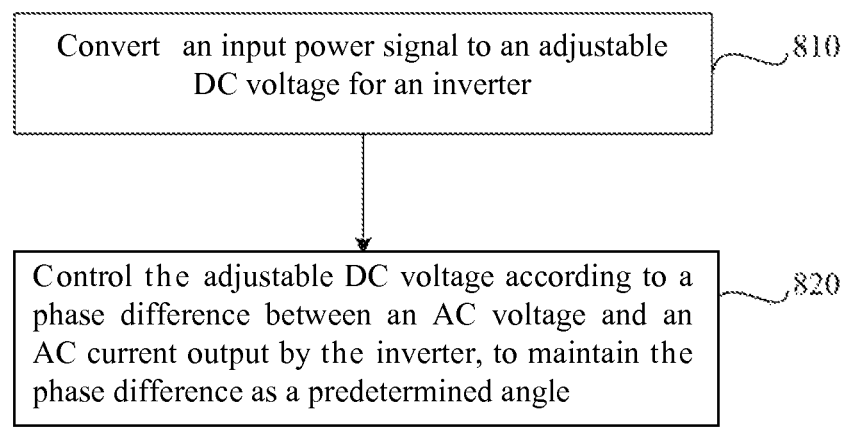
FIG. 8 is a flow diagram of an example impedance matching method, in accordance with embodiments of the present invention.

Referring now to FIG. 8, shown is a flow diagram of an example impedance matching method, in accordance with embodiments of the present invention. At 810, an input power signal can be converted (e.g., via converter 111) to an adjustable DC voltage (e.g., $V_{in}$) for an inverter (e.g., 112). At 820, the adjustable DC voltage can be controlled according to a phase difference between an AC voltage (e.g., $V_{ac}$) and an AC current (e.g., $i_{ac}$) output by the inverter, in order to maintain the phase difference as a predetermined angle. For example, the predetermined angle can be greater than or equal to about 50° and smaller than or equal to about 60°, such as about 55°.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A resonance contactless power supply device, comprising:
   a) a converter configured to convert an input power signal to an adjustable DC voltage;
   b) an inverter configured to receive said adjustable DC voltage, and to generate an AC voltage with a leakage inductance resonance frequency;
   c) a first resonance circuit comprising a transmitting coil, and being configured to receive said AC voltage from said inverter;
   d) a second resonance circuit comprising a receiving coil that is contactlessly coupled to said transmitting coil, wherein said second resonance circuit is configured to receive electric energy from said transmitting coil; and
   e) a control circuit configured to control said adjustable DC voltage according to a phase difference between said AC voltage and an AC current output by said inverter, such that said phase difference is maintained as a predetermined angle, wherein said control circuit comprises a current phase detector configured to detect a zero-crossing point of said AC current, an error amplifying circuit configured to generate an error amplifying signal by comparing a phase difference signal against an angle threshold signal that is proportional to said predetermined angle, and a compensation circuit configured to generate a compensation signal by compensating said error amplifying signal.

2. The resonance contactless power supply device according to claim 1, wherein said predetermined angle is greater than or equal to about 50°, and less than or equal to about 60°.

3. The resonance contactless power supply device according to claim 2, wherein said predetermined angle is about 55°.

4. The resonance contactless power supply device according to claim 1, wherein said control circuit comprises:
   a) said current phase detector configured to detect a phase of said AC current, and to generate a current phase signal that indicates whether said AC current is positive or negative;
   b) a compensation signal generator configured to obtain said phase difference according to a control signal and said current phase signal, and to generate said compensation signal according to said phase difference and said predetermined angle; and
   c) a control signal generator configured to generate a control signal according to a power stage current and said compensation signal, where said control signal is used to control said inverter in order to regulate said adjustable DC voltage.

5. The resonance contactless power supply device according to claim 4, wherein:
   a) said compensation signal generator is configured to receive said phase difference signal, and to generate said compensation signal according to said phase difference signal and said angle threshold signal; and
   b) said phase difference signal is proportional to said phase difference.

6. The resonance contactless power supply device according to claim 5, wherein said compensation signal generator comprises:
   a) an AND-gate configured to receive said current phase signal and said control signal, and to generate said phase difference width signal having a pulse width that corresponds to said phase difference; and
   b) an averaging circuit configured to generate said phase difference signal by averaging said phase difference width signal.

7. The resonance contactless power supply device according to claim 1, wherein said control circuit comprises an averaging circuit configured to determine said phase difference.

8. An integrated circuit configured for a resonance contactless energy transmitter, the integrated circuit comprising:
   a) a converter configured to convert an input power signal to an adjustable DC voltage;
   b) an inverter configured to receive said adjustable DC voltage, and to generate an AC voltage with a leakage inductance resonance frequency, wherein said AC voltage is configured to drive a first resonance circuit of said resonance contactless energy transmitter; and
   c) a control circuit configured to control said adjustable DC voltage according to a phase difference between said AC voltage and an AC current from said inverter, such that said phase difference is maintained as a predetermined angle, wherein said control circuit comprises a current phase detector configured to detect a zero-crossing point of said AC current, an error amplifying circuit configured to generate an error amplifying signal by comparing a phase difference signal against an angle threshold signal that is proportional to said predetermined angle, and a compensation circuit configured to generate a compensation signal by compensating said error amplifying signal.

9. The integrated circuit according to claim 8, wherein said predetermined angle is greater than or equal to about 50°, and less than or equal to about 60°.

10. The integrated circuit according to claim 9, wherein said predetermined angle is about 55°.

11. The integrated circuit according to claim 8, wherein said control circuit comprises:
   a) said current phase detector configured to detect a phase of said AC current, and to output a current phase signal that indicates whether said AC current is positive or negative;
   b) a compensation signal generator configured to obtain said phase difference according to a control signal and said current phase signal, and to generate said compensation signal according to said phase difference and said predetermined angle; and
   c) a control signal generator configured to generate a control signal according to a power stage current and said compensation signal, wherein said control signal is used to control said inverter in order to regulate said adjustable DC voltage.

12. The integrated circuit according to claim 11, wherein:
   a) said compensation signal generator is configured to receive said phase difference signal, and to generate said compensation signal according to said phase difference signal and said angle threshold signal; and
   b) said phase difference signal is proportional to said phase difference.

13. The integrated circuit according to claim 12, wherein said compensation signal generator comprises:
   a) an AND-gate configured to receive said current phase signal and said control signal, and to generate a phase difference width signal having a pulse width that corresponds to said phase difference; and
   b) an averaging circuit configured to generate said phase difference signal by averaging said phase difference width signal.

14. A resonance contactless energy transmitter, comprising the first resonance circuit of claim 8, wherein said first resonance circuit comprises a transmitting coil configured to receive said AC voltage from said inverter.

15. The integrated circuit according to claim 8, wherein said control circuit comprises an averaging circuit configured to determine said phase difference.

16. An impedance matching method for a resonance contactless power supply device, the method comprising:
   a) converting an input power signal to an adjustable DC voltage;
   b) receiving, by an inverter, said adjustable DC voltage, and generating an AC voltage with a leakage inductance resonance frequency;
   c) detecting, by a current phase detector, a zero-crossing point of an AC current output from said inverter;
   d) receiving, by a first resonance circuit comprising a transmitting coil, said AC voltage from said inverter;
   e) receiving, by a second resonance circuit comprising a receiving coil that is contactlessly coupled to said transmitting coil, electric energy from said transmitting coil;
   f) generating, by an error amplifying circuit, an error amplifying signal by comparing a phase difference signal against an angle threshold signal;
   g) generating, by a compensation circuit, a compensation signal by compensating said error amplifying signal; and
   h) controlling said adjustable DC voltage according to a phase difference between said AC voltage and said AC current output by said inverter, for maintaining said phase difference as a predetermined angle that is proportional to said angle threshold signal.

17. The impedance matching method according to claim 16, wherein said predetermined angle is greater than or equal to about 50°, and less than or equal to about 60°.

18. The impedance matching method according to claim 17, wherein said predetermined angle is about 55°.

19. The impedance matching method according to claim 16, further comprising indicating, by said current phase detector, whether said AC current is positive or negative.

20. The impedance matching method according to claim 16, further comprising using an averaging circuit to determine said phase difference.

* * * * *